(12) United States Patent
Awoniyi-Oteri et al.

(10) Patent No.: US 12,375,147 B2
(45) Date of Patent: Jul. 29, 2025

(54) BEAM UPDATES DURING A SECONDARY CELL GROUP (SCG) DORMANCY PERIOD

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Yan Zhou, San Diego, CA (US); Tao Luo, San Diego, CA (US); Punyaslok Purkayastha, San Diego, CA (US); Ozcan Ozturk, San Diego, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/001,844

(22) PCT Filed: Aug. 20, 2020

(86) PCT No.: PCT/CN2020/110244
§ 371 (c)(1),
(2) Date: Dec. 14, 2022

(87) PCT Pub. No.: WO2022/036630
PCT Pub. Date: Feb. 24, 2022

(65) Prior Publication Data
US 2023/0327726 A1    Oct. 12, 2023

(51) Int. Cl.
*H04B 7/06* (2006.01)
*H04B 7/0404* (2017.01)
(Continued)

(52) U.S. Cl.
CPC ....... *H04B 7/0626* (2013.01); *H04B 7/06952* (2023.05); *H04W 56/0015* (2013.01)

(58) Field of Classification Search
CPC .............. H04B 7/0626; H04B 7/06952; H04B 7/0404; H04B 7/0695; H04W 56/0015;
(Continued)

(56) References Cited

U.S. PATENT DOCUMENTS 10,721,720 B2    7/2020  Damnjanovic et al.
11,140,695 B1 *  10/2021 Eyuboglu ........... H04W 72/535
(Continued)

FOREIGN PATENT DOCUMENTS

CN          110536387 A        12/2019
WO       WO-2015116353          8/2015
(Continued)

OTHER PUBLICATIONS

Supplementary European Search Report—EP20949841—Search Authority—Munich—Apr. 2, 2024.
(Continued)

*Primary Examiner* — Harry H Kim
(74) *Attorney, Agent, or Firm* — NORTON ROSE FULBRIGHT US LLP

(57) ABSTRACT

A method of wireless communication for a user equipment (UE) includes entering a dormancy period for a secondary cell group (SCG) of a base station (BS) during which no downlink (DL) data or control transmissions are received from the SCG; performing a channel state information (CSI) measurement on the SCG during the dormancy period to generate a measurement report; determining an uplink (UL) beam of a primary secondary cell (PSCELL) of the SCG; transmitting the measurement report to the BS on the UL beam of the SCG; and determining, during the dormancy period and after transmitting the measurement report, one or more downlink (DL) beams for communicating on the SCG based on one or more rules and based on the measurement report, wherein the one or more rules result in the BS
(Continued)

determining the same one or more DL beams based on the measurement report.

18 Claims, 10 Drawing Sheets

(51) Int. Cl.
*H04L 5/00* (2006.01)
*H04W 24/10* (2009.01)
*H04W 52/02* (2009.01)
*H04W 56/00* (2009.01)
*H04W 76/15* (2018.01)
*H04W 76/27* (2018.01)
*H04W 76/28* (2018.01)

(58) Field of Classification Search
CPC . H04W 52/0235; H04W 76/27; H04W 24/10; H04W 76/15; H04W 76/28; H04L 5/001; H04L 5/0025; H04L 5/005; H04L 5/0053; Y02D 30/70
See application file for complete search history.

(56) References Cited

U.S. PATENT DOCUMENTS

| | | | | |
|---|---|---|---|---|
| 11,979,350 B1* | 5/2024 | Eyuboglu | ............ | H04B 7/0874 |
| 2020/0092814 A1* | 3/2020 | Zhou | ................. | H04W 52/0235 |
| 2020/0100179 A1* | 3/2020 | Zhou | ................. | H04W 52/0209 |
| 2020/0221323 A1 | 7/2020 | Xu et al. | | |
| 2021/0160126 A1* | 5/2021 | Cirik | ................. | H04W 52/0241 |
| 2023/0209385 A1* | 6/2023 | Tidestav | ............... | H04W 16/28 370/329 |
| 2023/0344497 A1* | 10/2023 | Wang | .................. | H04B 7/0639 |

FOREIGN PATENT DOCUMENTS

| | | |
|---|---|---|
| WO | WO-2020028792 A1 | 2/2020 |
| WO | WO-2020156156 A1 | 8/2020 |

OTHER PUBLICATIONS

Intel Corporation: "Practical Scoping of SCG Suspension Operation in NR", R2-1914576, 3GPP TSG RAN WG2 Meeting #108, Reno, USA, Nov. 18-22, 2019, Nov. 8, 2019 (Aug. 11, 2019), the whole document, 6 pages.

International Search Report and Written Opinion—PCT/CN2020/110244—ISA/EPO—May 19, 2021.

Qualcomm Incorporated: "Finalize Dormant BWP," 3GPP TSG RAN WG2 Meeting #110-e, R2-2004809, E-Conference, Jun. 1-2, 2020, May 22, 2020 (May 22, 2020), the whole document, 62 pages.

* cited by examiner

BEAM UPDATES DURING A SECONDARY CELL GROUP (SCG) DORMANCY PERIOD

CROSS-REFERENCE TO RELATED APPLICATIONS

This application is a National State Entry of International Patent Application No. PCT/CN2020/110244, entitled, "BEAM UPDATES DURING A SECONDARY CELL GROUP (SCG) DORMANCY PERIOD," filed on Aug. 20, 2020, which is expressly incorporated by reference herein in its entirety.

FIELD

Aspects of the present disclosure relate generally to wireless communication systems, and, more particularly, to wireless communications involving a dormancy period for the wireless communication system.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication for a user equipment (UE) includes entering a dormancy period for a secondary cell group (SCG) of a base station (BS) during which no downlink (DL) data or control transmissions are received from the SCG; performing a channel state information (CSI) measurement on the SCG during the dormancy period to generate a measurement report; determining an uplink (UL) beam of a primary secondary cell (PSCELL) of the SCG; transmitting the measurement report to the BS on the UL beam of the SCG; and/or determining, during the dormancy period and after transmitting the measurement report, one or more downlink (DL) beams for communicating on the SCG based on one or more rules and based on the measurement report, wherein the one or more rules result in the BS determining the same one or more DL beams based on the measurement report. In certain aspects, the method may also include changing a Transmission codepoint (TCI) state on the UE to the one or more DL beams, wherein changing the TCI state on the UE to the one or more downlink beams is performed without signaling from the BS. In certain aspects, determining the uplink (UL) beam is based on following a control resource set (CORESET) with a lowest ID and/or determining the uplink (UL) beam comprises selecting a plurality of UL beams to follow the determined one or more DL beams, wherein the measurement report is transmitted to the BS on a beam sweep during PUCCH/SRS transmissions on the plurality of UL beams.

In an additional aspect of the disclosure, performing the measurement in the SCG includes measuring at least one of a Channel State Information Reference Signal (CSI-RS) or a Synchronization and Signal Block (SSB) of at least one of the Primary Secondary Cell (PSCELL) or one or more secondary cell (SCELL(s)) of the SCG. In certain aspects, the measurement may include measuring the CSI on the PSCELL when the PSCELL and the one or more SCELL(s) of the SCG are on a same frequency band and/or measuring the CSI on the PSCELL and the one or more SCELL(s) when the PSCELL and the SCELLs of the SCG are on different frequency bands.

In certain aspects of the disclosure, the dormancy period may be entered after receiving an SCG dormancy command from a secondary node of the SCG, wherein entering the dormancy period for the SCG is based on receiving the SCG dormancy command. In certain aspects, the method may also include transitioning from the dormancy period to an active period; and/or communicating, with the BS, using the determined one or more DL beams after transitioning to the active period. The dormancy period may be exited after receiving an activation command from a master node (MN) of the BS, wherein the transitioning from the dormancy period to the active period is based on receiving the activation command.

In certain aspects, prior to entering the dormancy period, the method may include receiving, from the BS, an indication of one or more rules for determining the one or more downlink beams, wherein the determining the one or more downlink beams is based on the one or more rules.

In one aspect of the disclosure, a method of wireless communications for a base station (BS) may include instructing a user equipment (UE) to enter a dormancy period for a secondary cell group (SCG) during which the UE will receive no downlink (DL) data or control transmissions from the SCG; receiving a channel state information (CSI) measurement in a measurement report from the UE during the dormancy period for the SCG on a UL beam of a primary secondary cell (PSCELL) of the SCG; and/or determining, during the dormancy period and after transmitting the measurement report, one or more downlink (DL) beams for communicating with the UE on the SCG based on one or more rules and based on the measurement report, wherein the one or more rules result in the UE determining the same one or more DL beams based on the measurement report.

In an additional aspect of the disclosure, the method includes monitoring a plurality of uplink (UL) beams for receiving the measurement report, wherein the plurality of UL beams for monitoring are determined by following the determined one or more DL beams, wherein the measurement report is transmitted to the BS on a beam sweep during PUCCH/SRS transmissions on the plurality of UL beams and/or determining the uplink (UL) beam for receiving the measurement report, wherein determining the UL beam is based on following a control resource set (CORESET) with a lowest ID.

In certain aspects, the measurement report is based on measuring at least one of a Channel State Information Reference Signal (CSI-RS) or a Synchronization and Signal Block (SSB) of at least one of the Primary Secondary Cell (PSCELL) or one or more secondary cell (SCELL(s)) of the SCG. In certain aspects the measurement report is based on a measurement of the CSI on the PSCELL when the PSCELL and the one or more SCELL(s) of the SCG are on a same frequency band and/or a measurement of the CSI on the PSCELL and the one or more SCELL(s) when the PSCELL and the SCELLs of the SCG are on different frequency bands.

In an additional aspect of the disclosure, the method may include changing a Transmission codepoint (TCI) state for the UE to the one or more DL beams, wherein changing the TCI state on the UE to the one or more downlink beams is performed without signaling from the BS.

In certain embodiments, the method may include instructing the UE to enter the dormancy period for the SCG is based on a request from the UE to enter dormancy. In certain embodiments, the method may include transitioning from the dormancy period to an active period; and/or communicating, with the UE, using the determined one or more DL beams after transitioning to the active period.

In an additional aspect of the disclosure, a non-transitory computer-readable medium having program code recorded thereon. The program code further includes code for entering a dormancy period for a secondary cell group (SCG) of a base station (BS) during which no downlink (DL) data or control transmissions are received from the SCG; performing a channel state information (CSI) measurement on the SCG during the dormancy period to generate a measurement report; determining an uplink (UL) beam of a primary secondary cell (PSCELL) of the SCG; transmitting the measurement report to the BS on the UL beam of the SCG; and/or determining, during the dormancy period and after transmitting the measurement report, one or more downlink (DL) beams for communicating on the SCG based on one or more rules and based on the measurement report, wherein the one or more rules result in the BS determining the same one or more DL beams based on the measurement report.

In an additional aspect of the disclosure, a non-transitory computer-readable medium having program code recorded thereon. The program code further includes code for instructing a user equipment (UE) to enter a dormancy period for a secondary cell group (SCG) during which the UE will receive no downlink (DL) data or control transmissions from the SCG; receiving a channel state information (CSI) measurement in a measurement report from the UE during the dormancy period for the SCG on a UL beam of a primary secondary cell (PSCELL) of the SCG; and/or determining, during the dormancy period and after transmitting the measurement report, one or more downlink (DL) beams for communicating with the UE on the SCG based on one or more rules and based on the measurement report, wherein the one or more rules result in the UE determining the same one or more DL beams based on the measurement report.

In an additional aspect of the disclosure, an apparatus configured for wireless communication is disclosed. The apparatus includes at least one processor, and a memory coupled to the processor. The processor is configured to enter a dormancy period for a secondary cell group (SCG) of a base station (BS) during which no downlink (DL) data or control transmissions are received from the SCG; performing a channel state information (CSI) measurement on the SCG during the dormancy period to generate a measurement report; determine an uplink (UL) beam of a primary secondary cell (PSCELL) of the SCG; transmit the measurement report to the BS on the UL beam of the SCG; and/or determine, during the dormancy period and after transmitting the measurement report, one or more downlink (DL) beams for communicating on the SCG based on one or more rules and based on the measurement report, wherein the one or more rules result in the BS determining the same one or more DL beams based on the measurement report.

In an additional aspect of the disclosure, an apparatus configured for wireless communication is disclosed. The apparatus includes at least one processor, and a memory coupled to the processor. The processor is configured to instruct a user equipment (UE) to enter a dormancy period for a secondary cell group (SCG) during which the UE will receive no downlink (DL) data or control transmissions from the SCG; receive a channel state information (CSI) measurement in a measurement report from the UE during the dormancy period for the SCG on a UL beam of a primary secondary cell (PSCELL) of the SCG; and/or determine, during the dormancy period and after transmitting the measurement report, one or more downlink (DL) beams for communicating with the UE on the SCG based on one or more rules and based on the measurement report, wherein the one or more rules result in the UE determining the same one or more DL beams based on the measurement report.

In one aspect of the disclosure, an apparatus for wireless communication may include includes means for entering a dormancy period for a secondary cell group (SCG) of a base station (BS) during which no downlink (DL) data or control transmissions are received from the SCG; performing a channel state information (CSI) measurement on the SCG during the dormancy period to generate a measurement report; means for determining an uplink (UL) beam of a primary secondary cell (PSCELL) of the SCG; means for transmitting the measurement report to the BS on the UL beam of the SCG; and/or means for determining, during the dormancy period and after transmitting the measurement report, one or more downlink (DL) beams for communicating on the SCG based on one or more rules and based on the measurement report, wherein the one or more rules result in the BS determining the same one or more DL beams based on the measurement report.

In one aspect of the disclosure, an apparatus for wireless communication may include means for instructing a user equipment (UE) to enter a dormancy period for a secondary cell group (SCG) during which the UE will receive no downlink (DL) data or control transmissions from the SCG; means for receiving a channel state information (CSI) measurement in a measurement report from the UE during the dormancy period for the SCG on a UL beam of a primary secondary cell (PSCELL) of the SCG; and/or means for determining, during the dormancy period and after transmitting the measurement report, one or more downlink (DL) beams for communicating with the UE on the SCG based on one or more rules and based on the measurement report, wherein the one or more rules result in the UE determining the same one or more DL beams based on the measurement report.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
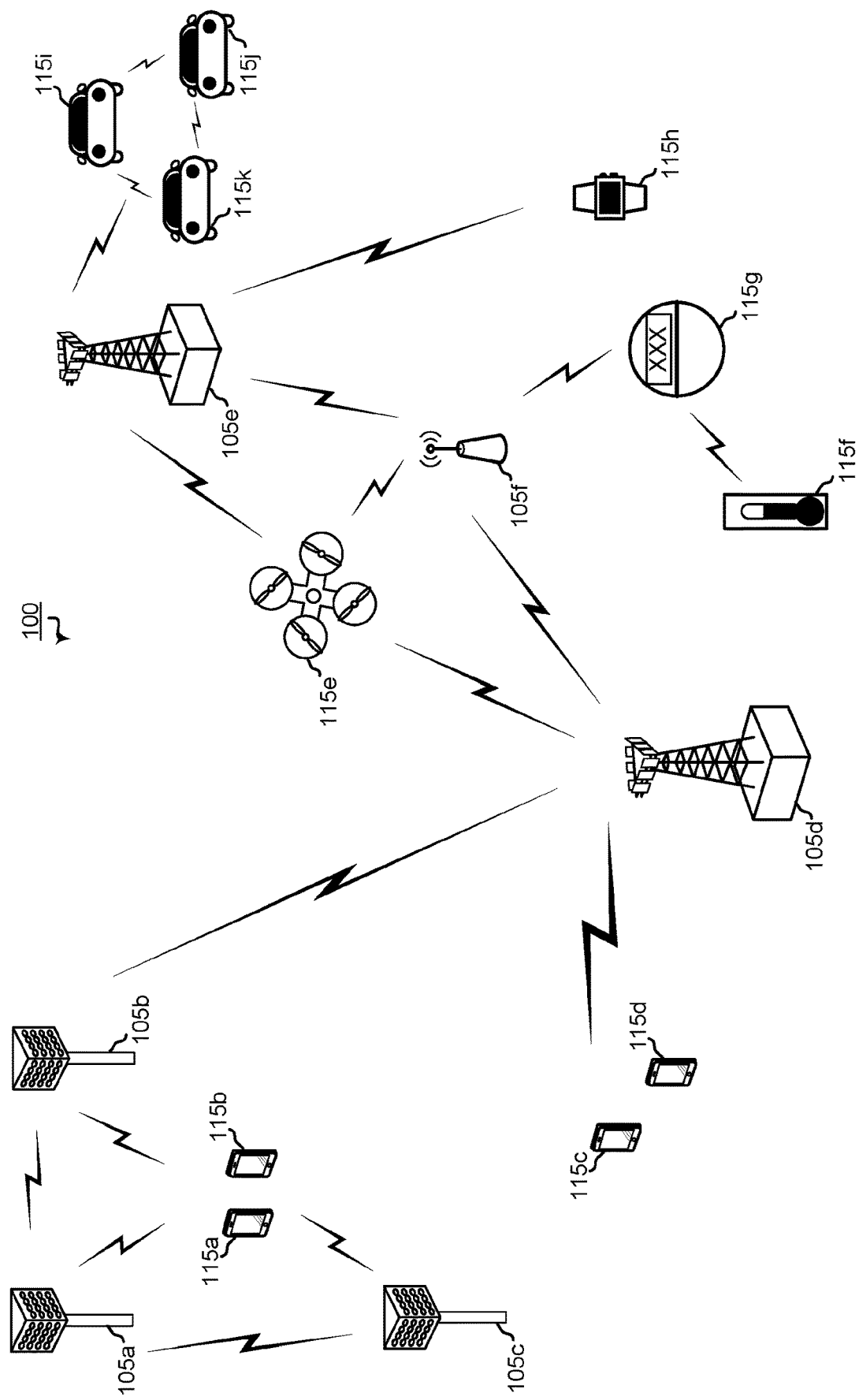
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
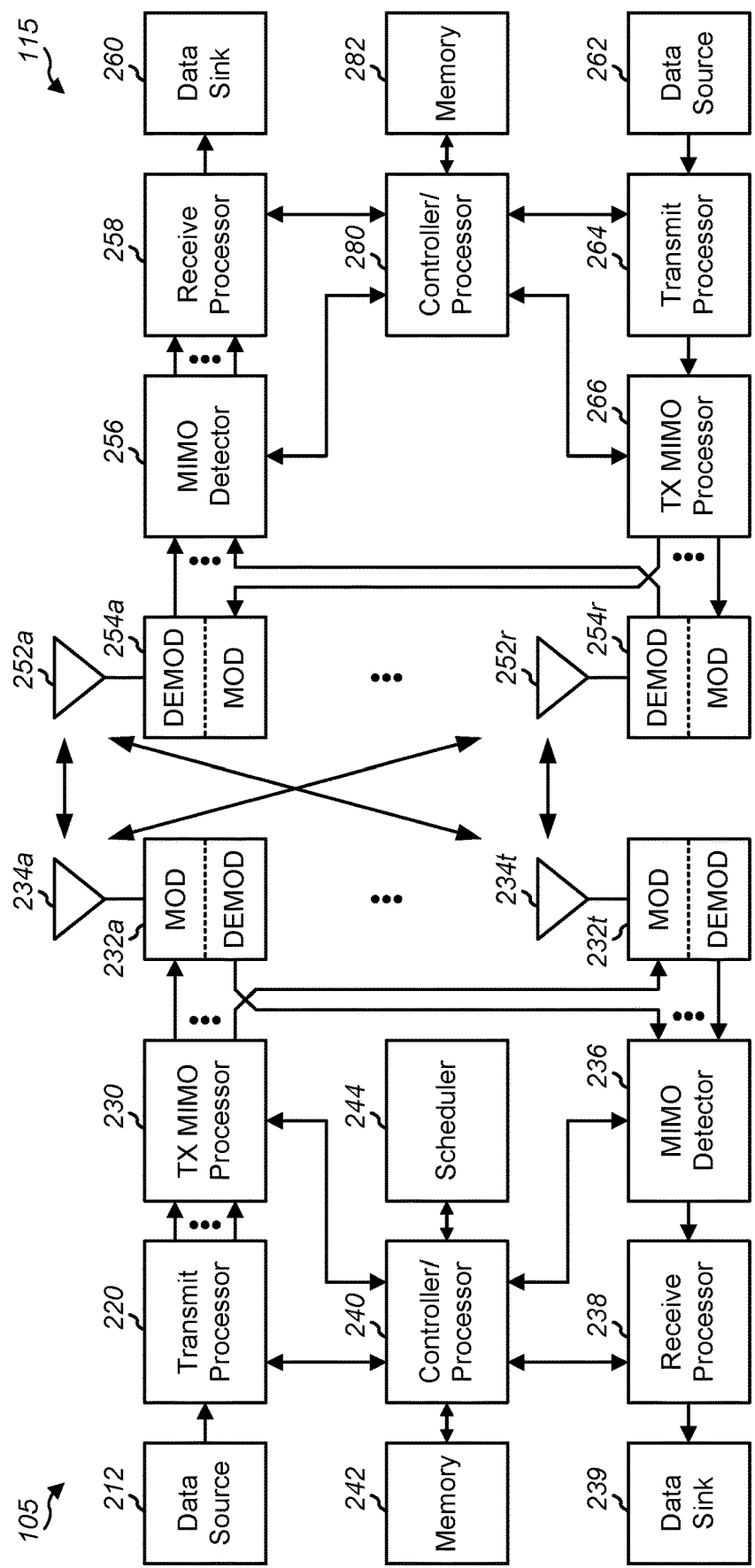
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6-9, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
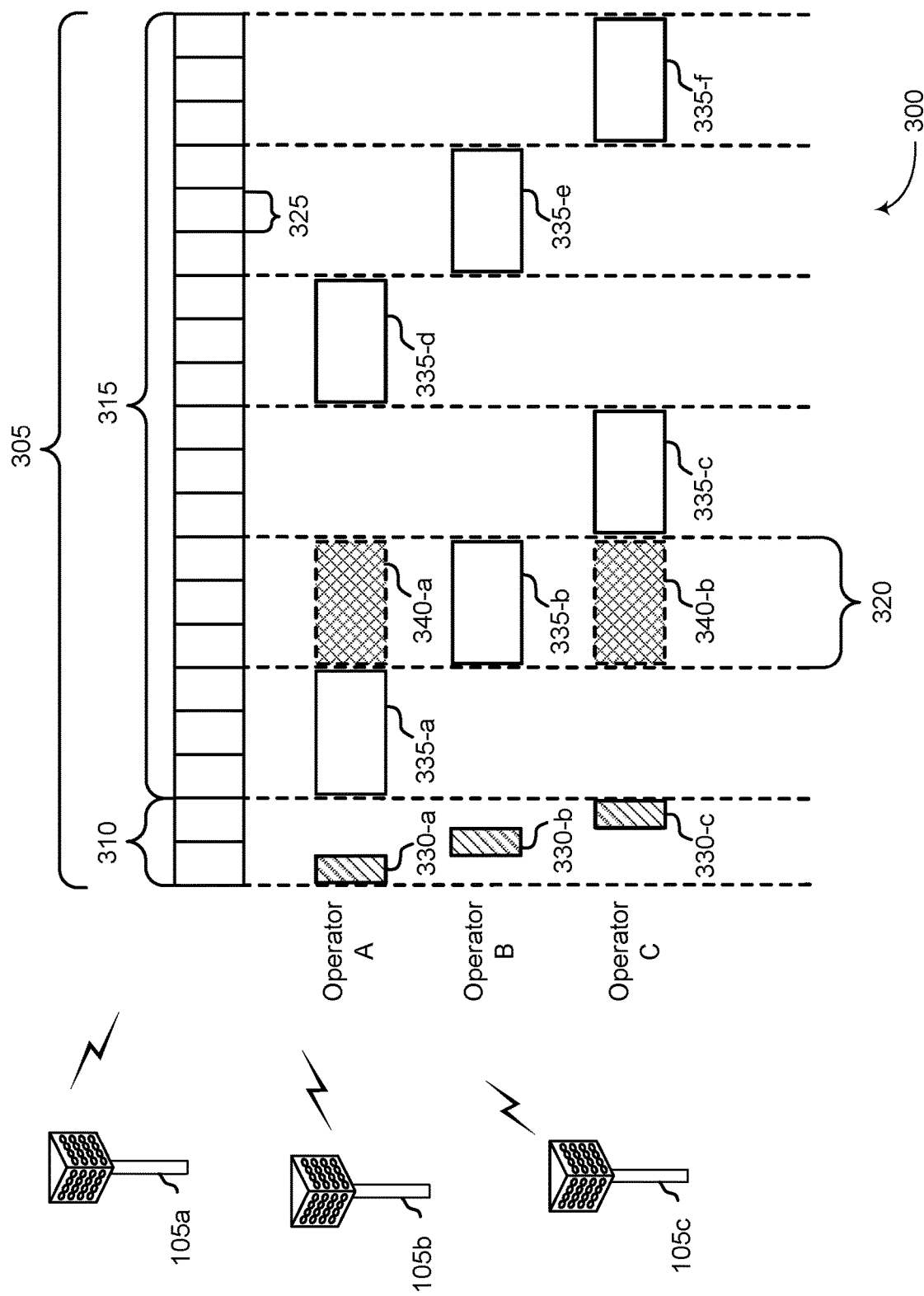
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, (e.g., G-INT-OpB), resources 335-*c* (e.g., G-INT-OpC) may be prioritized for Operator C, resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than one operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
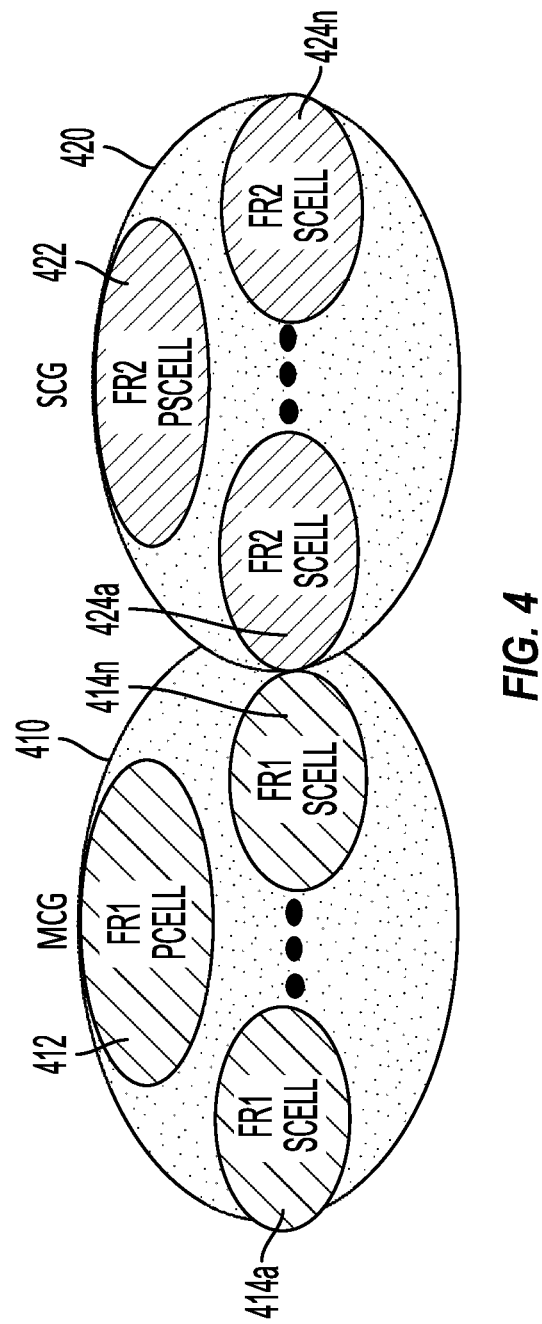
FIG. 4 is a block diagram illustrating a base station (BS) with a master cell group (MSG) and a secondary cell group (SCG) according to one aspect of the present disclosure.

Base stations (BSs) operating according to aspects of the present disclosure may be configured to include a number of cells that may communicate with user equipment (UE), and those cells may be organized into a master cell group (MCG) and a secondary cell group (SCG). FIG. 4 is a block diagram illustrating a base station (BS) with a master cell group (MSG) and a secondary cell group (SCG) according to one aspect of the present disclosure. A base station may include a master cell group (MCG) 410 under control of a master node (MN) and a secondary cell group (SCG) 420 under control of a secondary node (SN). The MCG 410 includes a primary cell (PCELL) 412, and the SCG 422 includes a primary secondary cell (PSCELL) 422. Each of the cell groups 410 and 420 may include one or more secondary cells (SCELLs) 414*a*-414*n* and 424*a*-424*n*, respectively. The number of SCELLS in groups 410 and 420 need not be identical. The groups 410 and 420 in the example network of FIG. 4 are operating on different frequency bands, and each of the cells within the groups 410 and 420 are on the same frequency band. For example, the MCG 410 includes a PCELL 412 and several SCELLs 414*a-n* operating in the FR1 frequency band, and the SCG 420 includes a PSCELL 422 and SCELLs 424*a-n* operating in the FR2 frequency band. Other frequency band configurations are possible, and another example band configuration is shown in FIG. 5.

Figure 5:
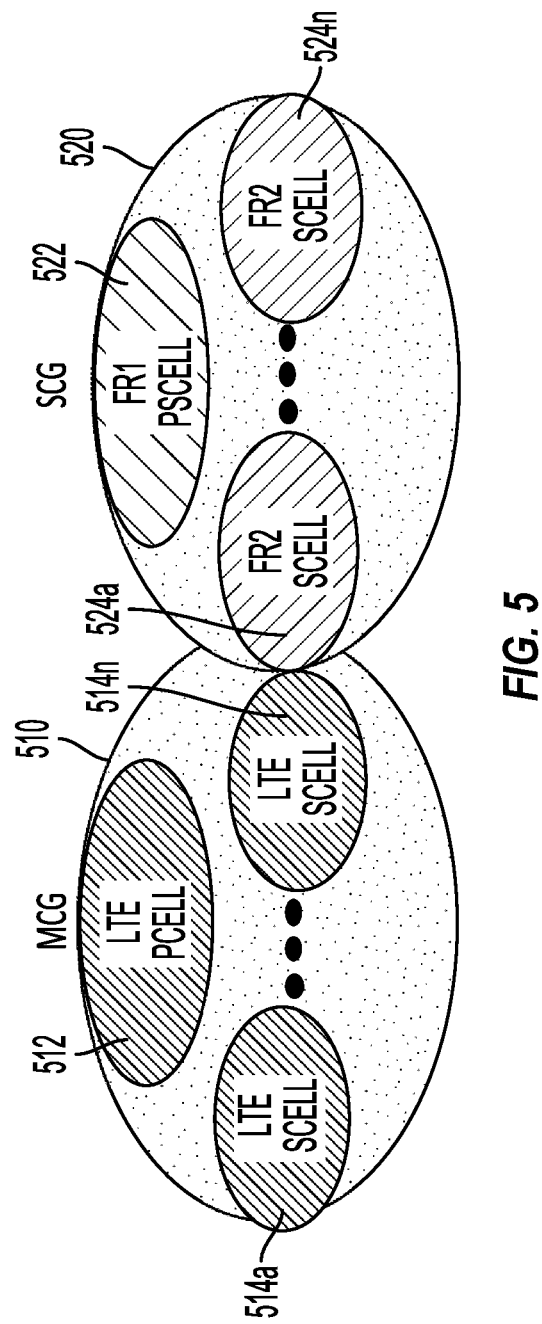
FIG. 5 is a block diagram illustrating a base station (BS) with a master cell group (MSG) and a secondary cell group (SCG) according to one aspect of the present disclosure.

FIG. 5 is a block diagram illustrating a base station (BS) with a master cell group (MSG) and a secondary cell group (SCG) according to one aspect of the present disclosure. A base station may include a master cell group (MCG) 510 under control of a master node (MN) and a secondary cell group (SCG) 520 under control of a secondary node (SN). The MCG 510 includes a primary cell (PCELL) 512, and the SCG 522 includes a primary secondary cell (PSCELL) 522. Each of the communication groups 510 and 520 may include one or more secondary cells (SCELLs) 514*a*-514*n* and 524*a*-524*n*. The number of SCELLS in the groups 510 and 520 need not be identical. The groups 510 and 520 in the example network of FIG. 5 have cells operating on different frequency bands. For example, MCG 510 includes a PCELL 512 and several SCELLs 514*a-n* operating in the LTE frequency band, and SCG 520 includes a PSCELL 522 operating on a FR1 frequency band and SCELLs 524*a-n* operating in the FR2 frequency band.

Each of the example BS configurations of FIGS. 4 and 5 is a multi-radio/radio access technology (RAT) dual-connectivity configuration. That is, the BSs may communicate with UEs on multiple RATs selected from LTE, FR1, FR2, or other 2G, 3G, or 5G RATs. Communicating on multiple RATs consumes additional resources on the UE over communicating on only one of the RATs. For example, the UE may consume additional power and processing resources to maintain the availability of communications on each of the RATs simultaneously. The UE may benefit from reducing communications on some of the RATs to reduce power consumption and processing resources. For example, referring to the networks of FIGS. 4-5 above, a UE may transition to a dormancy period on the secondary cell group (SCG) during which communications operations are reduced. During the dormancy period, the link between the UE and the SCG is maintained to allow quickly resuming operation with low latency on the SCG based on communication needs of the UE or BS. The reduced communications operations during dormancy may be involve an autonomous beam determination process during the dormancy period. When beam conditions change in the SCG during the dormancy period, the UE and the BS may autonomously transition from one beam to another beam without communicating the beam change from the BS to the UE. This autonomous beam determination may allow the UE to operate during the dormancy period without any downlink (DL) transmissions from the SCG. When the dormancy period is over, the UE and the BS will have the same determined beams for communication. Low latency resumption of operation on the SCG is capable when exiting the dormancy period because the UE and BS have autonomously determined the same beams for operation during the dormancy period. Power consumption is reduced during the dormancy period because the UE is reducing communication operations, such as by not receiving DL transmissions from the SCG.

In addition to beam determination, other operations carried out autonomously during the dormancy period may include radio resource monitoring (RRM), radio link monitoring (RLM), beam failure detection (BFD), beam failure recovery (BFR), L1 measurements, L1 measurement reporting, and sounding procedures. For example, RLM and BFD may be used for radio link failure (RLF) monitoring and beam failure detection (BFD), with RLM and BFD only performed on the PSCELL of the SCG in dormancy. BFD may also be configured for SCELLs in the SCG, such as for BSs configured similarly to that shown in FIG. 5. For an SCG in dormancy, RLM may be used to detect the PSCELL radio link failure and BFD in the PSCELL may detect beam failure. Further, BFD for the SCELL may detect beam failure on the SCELLs. If beam failure is detected, a beam failure report may be communicated to the SN by sending a beam failure report through a random access channel (RACH) to the SN through the PSCELL. After BFD on PSCELL or SCELL and beam failure reporting on the RACH, the SN may instruct the UE during RACH communications whether to perform beam failure recovery (BFR) on the SCG.

In some aspects of the present disclosure, the beam determination within the SCG may be determined based on L1 measurements or sounding procedures. L1 measurements may be performed on the PSCELL only or on the PSCELL and one or more SCELLs. The L1 reference signals used for measurements may include periodic/semi-periodic/aperiodic CSI-RS, periodic/aperiodic SRS measurements, BFD-RS, or aperiodic tracking reference signal (TRS). The L1 measurements may be performed and reported to the PSCELL, including L1 measurement reports for PSCELL and SCELLs transmitted to a secondary node (SN) using Physical Uplink Control Channel (PUCCH) resources or sounding reference signal (SRS) transmission to the SN. According to some aspects, the PUCCH and SRS transmissions may be multiplexed, such as to improve efficiency of UL transmissions.

Conventionally, beam updates would be determined from the L1 measurements provided by the UE to the SN, and an instructions to update beams transmitted from the SN to the UE on a Physical Downlink Control Channel (PDCCH) or Physical Downlink Shared Channel (PDSCH). However, the SN is unable to instruct beam updates if downlink (DL) transmissions are disabled during SCG dormancy. If DL transmissions are not available for beam updates, a rule-based autonomous procedure may be used to update beams on the UE and the BS without an explicit beam update message from the BS to the UE. The rule-based autonomous procedure may also be used when DL transmission are enabled, such as to improve resource utilization within the SCG. According to some aspects, a designated dormant DL/UL bandwidth part (BWP) may be used by the PSCELL that is different from BWPs used by the other SCELLs to improve PDCCH/PUCCH performance.

Figures 6, 7:
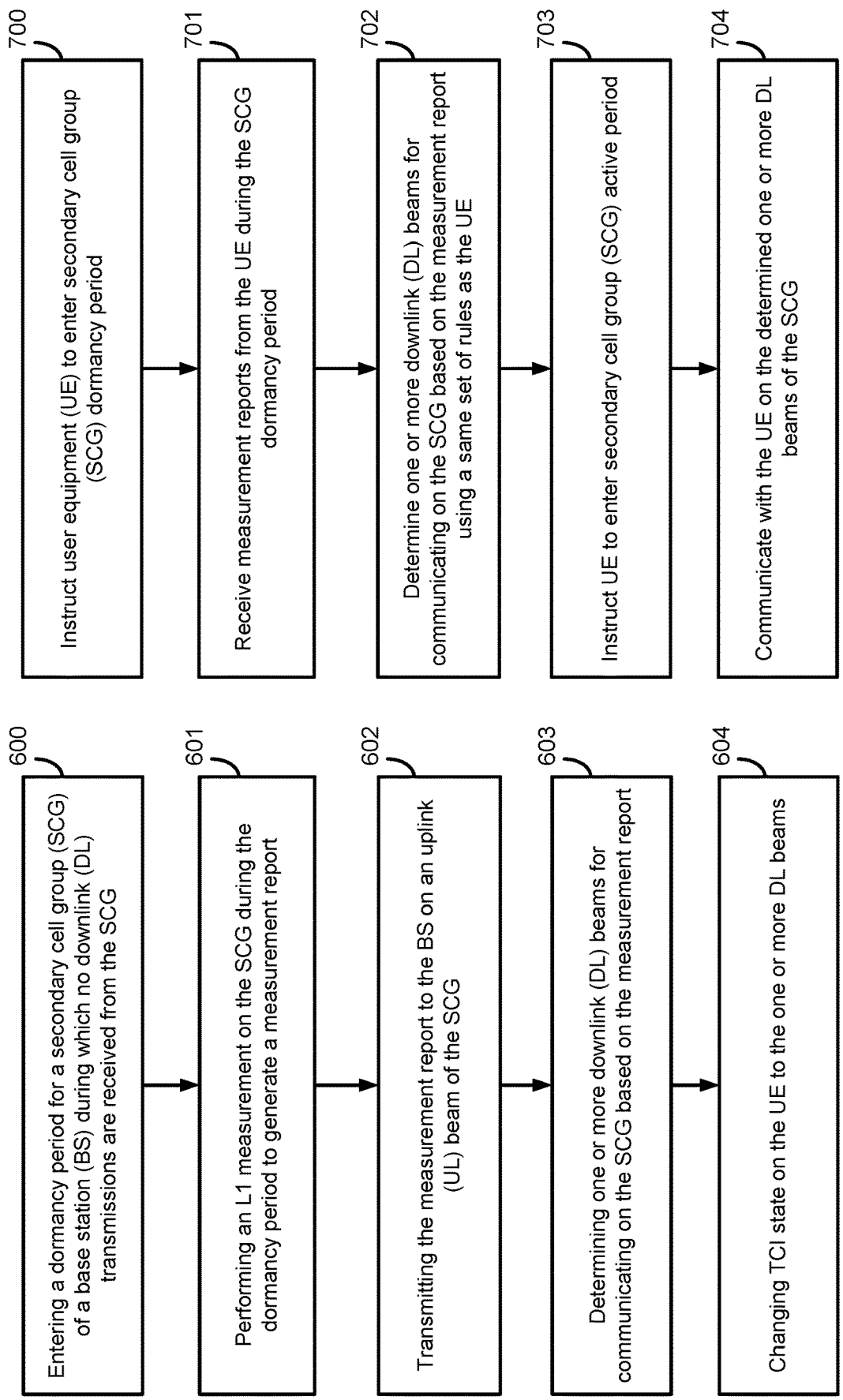
FIG. 6 is a flow chart illustrating a method for wireless communications by a user equipment (UE) during a secondary cell group (SCG) dormancy period according to some aspects of the disclosure.
FIG. 7 is a flow chart illustrating a method for wireless communications by a base station (BS) during a secondary cell group (SCG) dormancy period according to some aspects of the disclosure.

FIG. 6 is a flow chart illustrating a method for wireless communications by a user equipment (UE) during a secondary cell group (SCG) dormancy period according to some aspects of the disclosure. At block 600 the UE may enter a dormancy period for a secondary cell group (SCG). In some aspects, there may be no DL transmissions received from the SCG during the dormancy period. In some aspects, other operations during the dormancy period may be adjusted to reduce power consumption or processing resources without terminating DL transmissions.

At block 601, the UE may perform an L1 measurement on the SCG during the dormancy period to generate a measurement report. In some aspects, the UE may perform measurements on the PSCELL and the SCELLs in the SCG. For example, when the PSCELLs and SCELLs are on different frequency bands, as shown in the example system of FIG. 5, separate measurements may be performed on the different PSCELL and SCELLs of different frequency bands. In some aspects, the UE may perform measurements on the PSCELL and use those measurements as representative of the SCELLs of the same SCG as the PSCELL. For example, when the PSCELL and the SCELLs are on the same frequency band as shown in the example system of FIG. 4, a measurement on the PSCELL may accurately represent the link quality of the SCELLs on the same frequency band.

At block 602, the UE may transmit the measurement report to the secondary node (SN) of the SCG on an uplink (UL) beam of the SCG.

At block 603, the UE may determine one or more downlink (DL) beams for communicating on the SCG based on the measurement report received at block 602. The DL beams may be determined based on a set of rules established at the UE. In some aspects, the set of rules may be predetermined on the UE and BS. In some aspects, the BS may determine the rules for autonomous beam determination and transmit the rules to the UE to be applied during the dormancy period. In some aspects, the BS and UE may negotiate the rules prior to entering the dormancy period. The rules on the UE and BS may be synchronized such that each of the UE and BS arrive at the same determined one or more beams for the same set of measurement reports. The rules may specify how to determine one or more DL beams from the available beams in the SCG. According to some aspects, the rules may specify selecting a beam with a highest signal-to-noise ratio (SNR). The measurement reports allow the UE and BS to determine new beams for communicating when conditions change during the dormancy period to reduce the likelihood of beam failure. The UE and BS will be communicating on the same one or more beams when exiting the dormancy period without explicit signaling between the UE and BS during the dormancy period when the dormancy period is exited.

At block 604, the UE may change a transmission codepoint (TCI) state on the UE to the determined one or more DL beams of block 603. This change in activation state may be performed autonomously without an explicit instruction received from the BS.

Blocks 601, 602, 603, and 604 may be performed multiple times during the dormancy period entered at block 600. In some aspects, blocks 601, 602, 603, and 604 may be performed at periodic or aperiodic intervals. In some aspects, blocks 601, 602, 603, and 604 may be performed in a different order. For example, in some aspects, blocks 601 and 602 may be performed multiple times to obtain multiple measurement reports for each determination of the DL beams at block 603.

The dormancy period may end at the instruction of the BS or at a predetermined condition. For example, the BS may transmit an instruction to exit the dormancy period and enter an active period. UE may then communicate with the BS through the determined one or more beams of block 603 that are activated at block 604.

The BS may perform a method similar to the UE for determining one or more beams autonomously such that the BS and UE are synchronized in beam determination. FIG. 7 is a flow chart illustrating a method for wireless communications by a base station (BS) during a secondary cell group (SCG) dormancy period according to some aspects of the disclosure.

At block 700, the BS may instruct the user equipment (UE) to enter a secondary cell group (SCG) dormancy period. The dormancy period may be instructed, for example, based on a report from the UE that the UE is overheating or based on a reduced data demand by the UE.

At block 701, the BS may receive measurement reports from the UE during the SCG dormancy period. The measurements reports may include any of those described with reference to blocks 601 and 602 or other measurement reports.

At block 702, the BS may determine one or more downlink (DL) beams for communicating on the SCG based on the measurement reports received at block 701 using a same set of rules at the UE. By using the same set of rules as the UE at block 702 and block 603, the UE and the BS may be synchronized in beam determination such that both the UE and BS have determined the same beam for communication during a subsequent active period for the SCG. In some aspects, this synchronization is achieved without explicit signaling from the BS to the UE.

At block 703, the BS may instruct the UE to enter an active period for the SCG. The active period may be instructed based on, for example, an increased data demand by the UE.

At block 704, the BS may communicate with the UE on the determined one or more DL beams of the SCG in the active period initiated at block 703.

Figure 8:
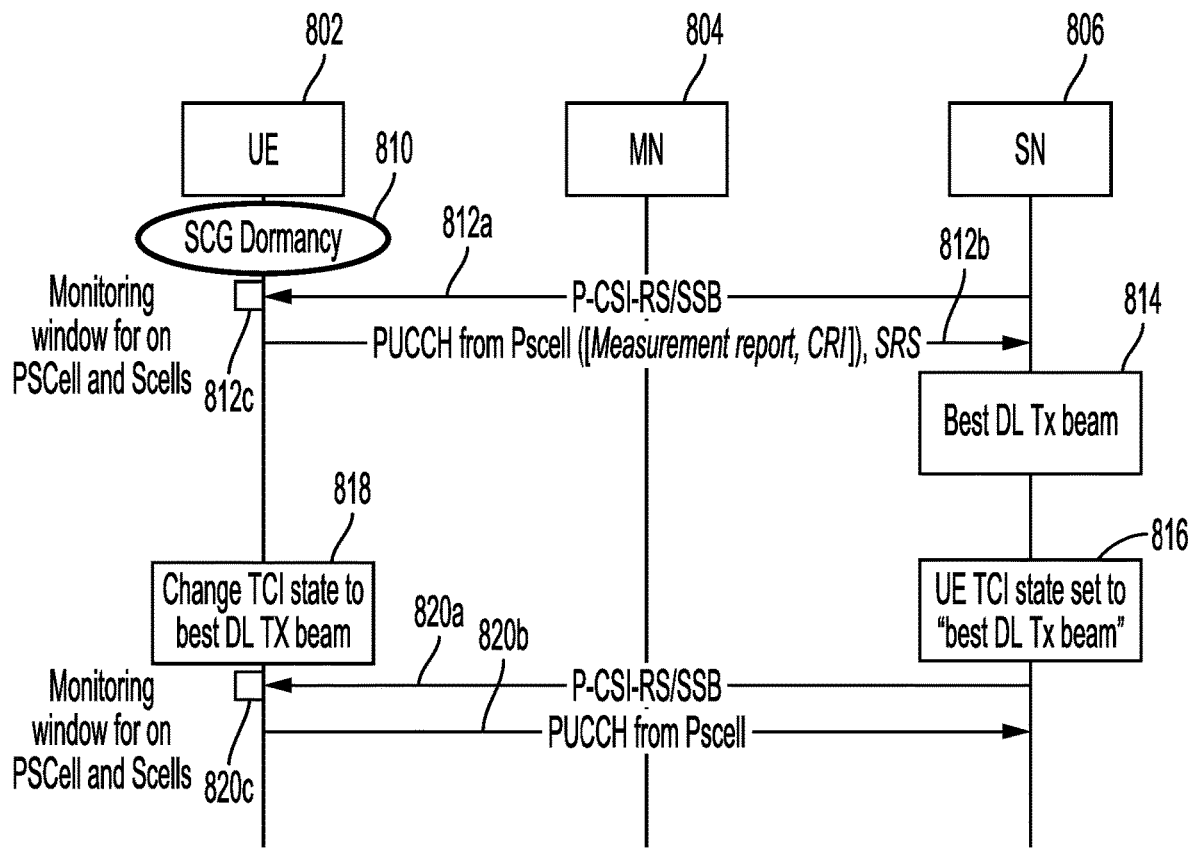
FIG. 8 is a call flow diagram illustrating a method for wireless communications for updating downlink (DL) beams during a secondary cell group (SCG) dormancy period according to some aspects of the disclosure.

An example of communications between the UE and BS according to aspects of the disclosure is shown in FIG. 8. FIG. 8 is a call flow diagram illustrating a method for wireless communications for updating downlink (DL) beams during a secondary cell group (SCG) dormancy period according to some aspects of the disclosure. A UE 802 may communicate with a BS, including master node (MN) 804 and secondary node (SN) 806. The UE 802 may enter a SCG dormancy state at block 810. During dormancy, the UE 802 may use a monitoring window for the PSCELL and/or the SCELLs at call 812c. During that monitoring period, the UE 802 may monitor, at call 812a, a P-CSI-RS and/or SSB signal from the SN 806. Subsequently, the UE 802 may provide a measurement report at call 812b on a PUCCH and/or SRS. The SN 806 may determine a best downlink (DL) beam at block 814 and change the UE Transmission codepoint (TCI) state to the best DL beam determined at block 816. The UE may correspondingly change its TCI state to the same best DL beam at block 818. In some aspects, the Transmission codepoint (TCI) state changes at blocks 816 and 818 are performed without explicit signaling between the UE 802 and the SN 806 indicating the best beam. If the dormancy state remains active, the UE 802 continues with more monitoring at call 818 using P-CSI-RS and/or SSB signals received at call 820a to generate measurement reports that are transmitted to the SN 806 at call 820b.

Figure 9:
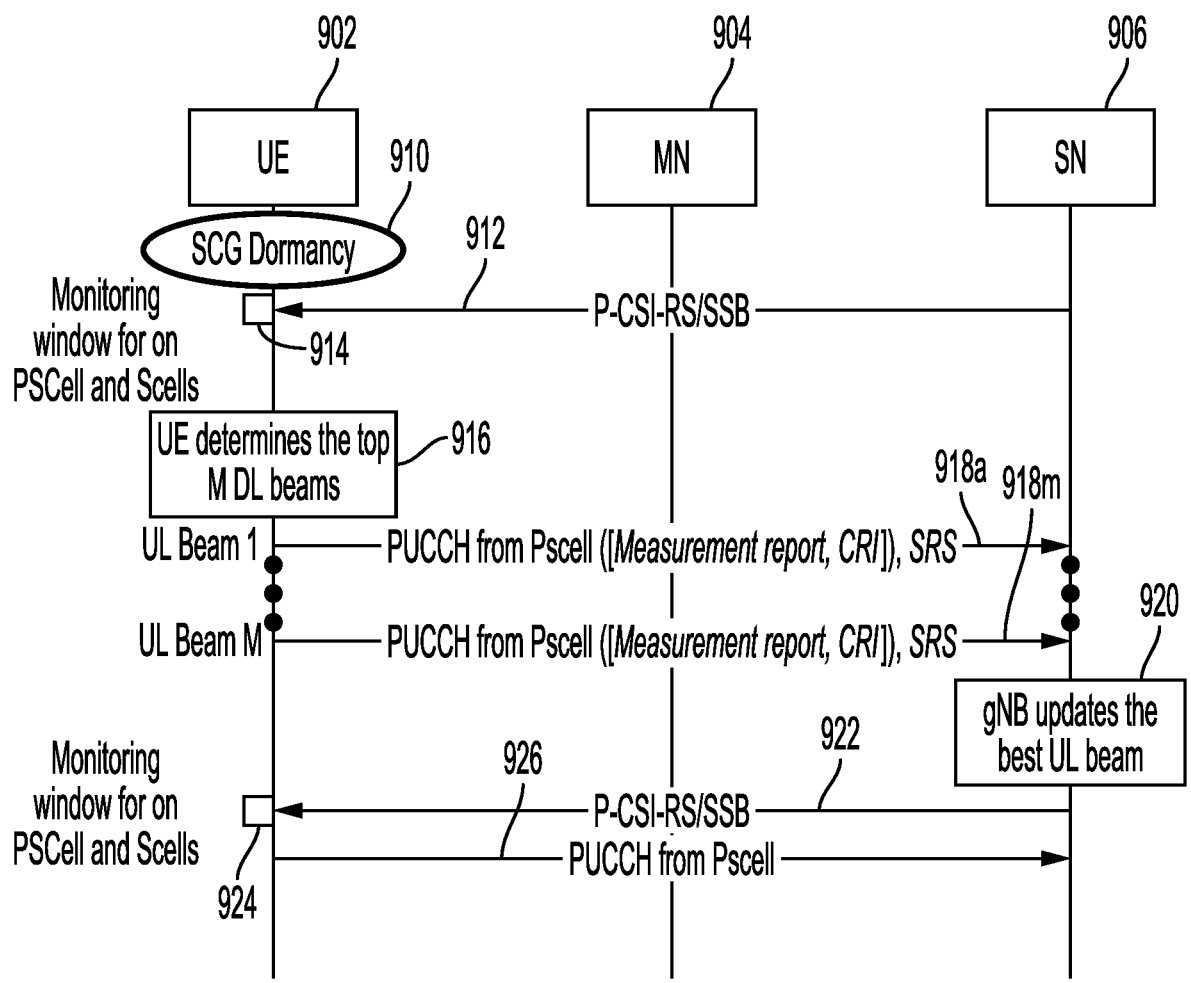
FIG. 9 is a call flow diagram illustrating a method for wireless communications for updating uplink (UL) beams during a secondary cell group (SCG) dormancy period according to some aspects of the disclosure.

In some aspects, the UE may also autonomously update an uplink beam used by the UE for transmitting measurement reports. FIG. 9 is a call flow diagram illustrating a method for wireless communications for updating uplink (UL) beams during a secondary cell group (SCG) dormancy period according to some aspects of the disclosure. A UE 902 may communicate with a BS, including a MN 904 and a SN 906. The UE 902 may enter a dormancy period for a SCG at block 910. The UE 920 may monitor the PSCELL and/or the SCELLs at call 910 using transmitted P-CSI-RS and/or SSB from the SN 906 at call 912. The UE 902 may determine the one or more best DL beams at block 916 from the measurements made during call 914 of the signals transmitted at call 912. A number m of the top DL beams may be selected from the DL beams and measurement reports transmitted to the SN 906 on UL beams corresponding to m DL beams. The measurement report may be transmitted on UL beams 1-m at calls 918a-m. According to some aspects, the same measurement reports may be transmitted on each of the UL beams 1-m at calls 918a-m. The SN 906 may determine at block 920 the best UL beam for current conditions in the cell environment around the UE 902. The SN 906 may transmit reference signals, such as P-CSI-RS and/or SSB at call 922. The UE 902 may continue to monitor the reference signals at block 924 by performing L1 measurements to generate measurement reports and transmit the measurement reports on the PUCCH at call 926.

According to some aspects, the UE may select a UL PUCCH/SRS beam for transmitting reports to follow the determined best DL beam. For example, the UE 902 may use the beams associated with the top two or three highest L1-reference signal received powers (RSRPs) to perform a beam sweep during PUCCH and/or SRS transmissions, such that multiple copies of the PUCCH and/or SRS are transmitted using the top two or three beams. According to some aspects, UE 902 may select the UL beam to follow the DL beam. For example, the UE 902 may use the beams associated with the top two highest L1-RSRP to send the PUCCH and/or SRS. According to some aspects, the UE 902 may use the UL beam that follows the CORESET with the lowest ID. The CORESET may be used when there is little or no beam correspondence between DL and UL beams.

According to some aspects of the present disclosure, a UE operating in a EN-DC Inter-band CA wireless communication system may perform radio link monitoring (RLM) and beam failure detection (BFD) on the PSCELL and the SCELLs of an SCG with beam failure reports made via the RACH to the PSCELL. In some of these aspects of the present disclosure, the beam determinations may be made autonomously based on L1 measurement reports for PSCELL and SCELLs made by monitoring a CSI-RS signal received on the PSCELL and the SCELLs may be transmitted using the PUCCH on the PSCELL and/or SRS on the PSCELL.

According to some aspects of the present disclosure, a UE operating in a NR DC Intra-band CA wireless communication system may perform radio link monitoring (RLM) and beam failure detection (BFD) on the PSCELL of an SCG with beam failure reports made via the RACH to the PSCELL. In some of these aspects of the present disclosure, the beam determinations may be made autonomously based on L1 measurement reports for PSCELL made by monitoring a CSI-RS signal received from the PSCELL may be transmitted using the PUCCH on the PSCELL and/or SRS on the PSCELL.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 6, 7, 8, or 9 may comprise processors, electronics devices, hardware devices, electronics components, logical circuits, memories, software codes, firmware codes, etc., or any combination thereof.

Figure 10:
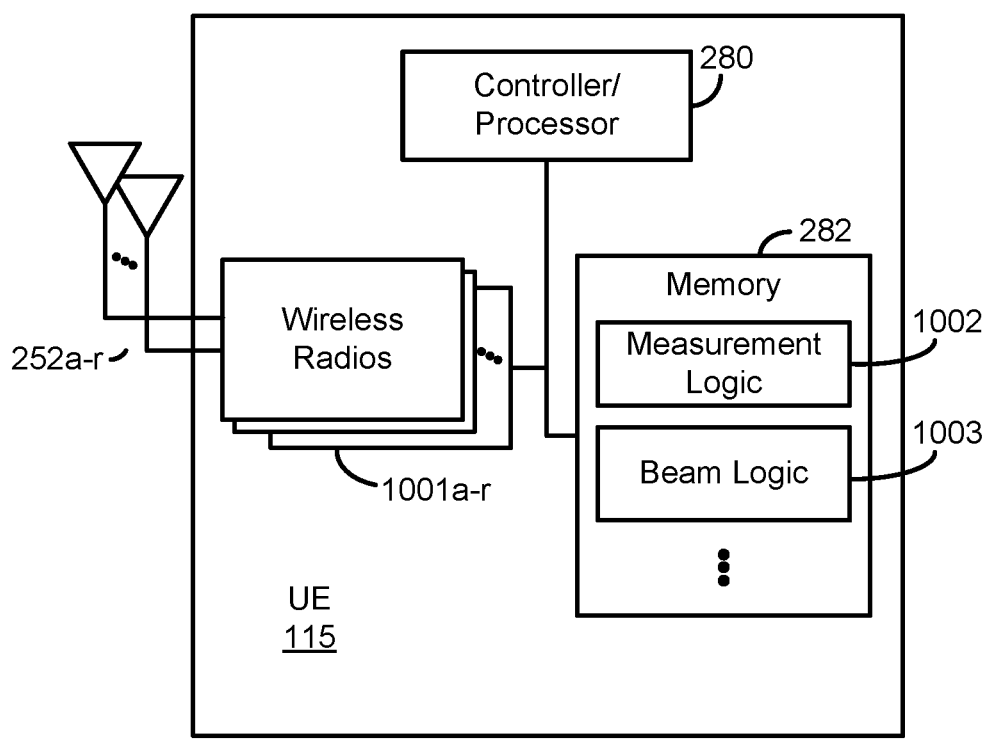
FIG. 10 is a block diagram illustrating a UE configured according to one aspect of the present disclosure.

FIGS. 6-7 and 8-9 are block diagrams illustrating example blocks executed to implement one aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000-r and antennas 252a-r. Wireless radios 1000a-r includes various components and hardware, as illustrated in FIG. 2 for UE 115, including modulator/demodulators 254a-r, MIMO detector 256, receive processor 258, transmit processor 264, and TX MIMO processor 266. The processor 280 may include a means 1002 for performing measurements in a wireless communication system and a means 1003 for autonomously determining a beam based on rules using information from measurement reports.

Figure 11:
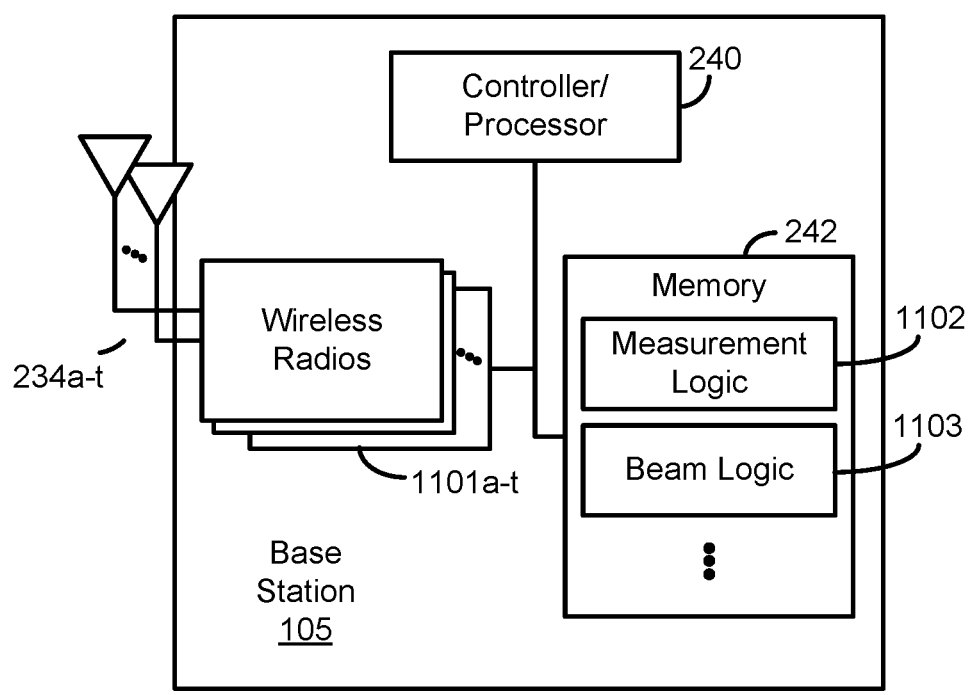
FIG. 11 is a block diagram illustrating an eNB configured according to one aspect of the present disclosure.

FIGS. 6-7 and 8-9 are block diagrams illustrating example blocks executed to implement one aspect of the present disclosure. The example blocks will also be described with respect to eNB 105 as illustrated in FIG. 11. FIG. 11 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 1100a-t and antennas 234a-t. Wireless radios 1100a-t includes various components and hardware, as illustrated in FIG. 2 for eNB 105, including modulator/demodulators 232a-t, MIMO detector 236, receive processor 238, transmit processor 220, and TX MIMO processor 230. The controller/processor 240 may include means 1101 for processing measurement reports received from a UE and means 1102 for autonomously determining a beam based on rules using information from the measurement reports.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus configured for wireless communication, the apparatus comprising:
   at least one processor; and
   a memory coupled to the at least one processor,
   wherein the at least one processor is configured:
      to enter a dormancy period for a secondary cell group (SCG) of a base station (BS) during which no downlink (DL) data or control transmissions are received from the SCG;
      to perform a channel state information (CSI) measurement on the SCG during the dormancy period to generate a measurement report;
      to determine an uplink (UL) beam of a primary secondary cell (PSCELL) of the SCG;
      to transmit the measurement report to the BS on the UL beam of the SCG; and
      to determine, during the dormancy period and after transmitting the measurement report, one or more downlink (DL) beams for communicating on the SCG based on one or more rules and based on the measurement report, wherein the one or more rules result in the BS determining the same one or more DL beams based on the measurement report.

2. The apparatus of claim 1, wherein the processor is configured to measure at least one of a Channel State Information Reference Signal (CSI-RS) or a Synchronization and Signal Block (SSB) of at least one of the Primary Secondary Cell (PSCELL) or one or more secondary cell (SCELL(s)) of the SCG.

3. The apparatus of claim 2, wherein the processor is configured to measure the CSI on the PSCELL when the PSCELL and the one or more SCELL(s) of the SCG are on a same frequency band.

4. The apparatus of claim 2, wherein the processor is configured to measure the CSI on the PSCELL and the one or more SCELL(s) when the PSCELL and the SCELLs of the SCG are on different frequency bands.

5. The apparatus of claim 1, wherein the processor is configured to change a Transmission codepoint (TCI) state on the UE to the one or more DL beams, wherein changing the TCI state on the UE to the one or more downlink beams is performed without signaling from the BS.

6. The apparatus of claim 1, wherein the processor is configured to receive an SCG dormancy command from a secondary node of the SCG, wherein entering the dormancy period for the SCG is based on receiving the SCG dormancy command.

7. The apparatus of claim 1, wherein the processor is configured to select a plurality of UL beams to follow the determined one or more DL beams, wherein the measurement report is transmitted to the BS on a beam sweep during PUCCH/SRS transmissions on the plurality of UL beams.

8. The apparatus of claim 1, wherein the processor is configured to determine the UL beam based on following a control resource set (CORESET) with a lowest ID.

9. The apparatus of claim 1, wherein the processor is further configured to transition from the dormancy period to an active period; and to communicate, with the BS, using the determined one or more DL beams after transitioning to the active period.

10. An apparatus configured for wireless communication, the apparatus comprising:
    at least one processor; and
    a memory coupled to the at least one processor,
    wherein the at least one processor is configured:
       to instruct a user equipment (UE) to enter a dormancy period for a secondary cell group (SCG) during which the UE will receive no downlink (DL) data or control transmissions from the SCG;
       to receive a channel state information (CSI) measurement in a measurement report from the UE during the dormancy period for the SCG on a UL beam of a primary secondary cell (PSCELL) of the SCG; and
       to determine, during the dormancy period and after transmitting the measurement report, one or more downlink (DL) beams for communicating with the UE on the SCG based on one or more rules and based on the measurement report, wherein the one or more rules result in the UE determining the same one or more DL beams based on the measurement report.

11. The apparatus of claim 10, wherein the measurement report is based on measuring at least one of a Channel State Information Reference Signal (CSI-RS) or a Synchronization and Signal Block (SSB) of at least one of the Primary Secondary Cell (PSCELL) or one or more secondary cell (SCELL(s)) of the SCG.

12. The apparatus of claim 11, wherein the measurement report is based on a measurement of the CSI on the PSCELL when the PSCELL and the one or more SCELL(s) of the SCG are on a same frequency band.

13. The apparatus of claim 11, wherein the measurement report is based on a measurement of the CSI on the PSCELL and the one or more SCELL(s) when the PSCELL and the SCELLs of the SCG are on different frequency bands.

14. The apparatus of claim 10, wherein the processor is configured to change a Transmission codepoint (TCI) state for the UE to the one or more DL beams, wherein changing the TCI state on the UE to the one or more downlink beams is performed without signaling from the BS.

15. The apparatus of claim 10, wherein the processor is configured to instruct the UE to enter the dormancy period for the SCG based on a request from the UE to enter dormancy.

16. The apparatus of claim 10, wherein the processor is configured to monitor a plurality of uplink (UL) beams for receiving the measurement report, wherein the plurality of UL beams for monitoring are determined by following the determined one or more DL beams, wherein the measurement report is transmitted to the BS on a beam sweep during PUCCH/SRS transmissions on the plurality of UL beams.

17. The apparatus of claim 10, wherein the processor is configured to determine the uplink (UL) beam for receiving the measurement report, wherein determining the UL beam is based on following a control resource set (CORESET) with a lowest ID.

18. The apparatus of claim 10, wherein the processor is configured to transition from the dormancy period to an active period; and to communicate, with the UE, using the determined one or more DL beams after transitioning to the active period.

* * * * *